United States Patent [19]

Kaharu et al.

[11] Patent Number: 5,130,836
[45] Date of Patent: Jul. 14, 1992

[54] OPTICAL TRANSCEIVER

[75] Inventors: Takeo Kaharu; Yuzo Kohsaka, both of Tokyo, Japan

[73] Assignee: Japan Aviation Electronics Industry Limited, Tokyo, Japan

[21] Appl. No.: 703,789

[22] Filed: May 21, 1991

[30] Foreign Application Priority Data

Jun. 1, 1990 [JP] Japan .................. 2-144228

[51] Int. Cl.⁵ .................. H04B 10/00; G02B 6/28
[52] U.S. Cl. .................. 359/152; 359/158
[58] Field of Search .......... 359/152, 153, 154, 158, 359/113, 119, 137; 385/24, 31; 370/85.1, 85.9; 375/55, 110; 341/70

[56] References Cited

U.S. PATENT DOCUMENTS

| 4,654,844 | 3/1987 | Mandello | 359/113 |
| 4,809,361 | 2/1989 | Okada et al. | 359/136 |
| 5,026,137 | 6/1991 | Tokumitsu | 385/24 |

FOREIGN PATENT DOCUMENTS 0380341  8/1990  European Pat. Off. ........ 385/24

Primary Examiner—Edward L. Coles, Sr.
Assistant Examiner—Kinfe-Michael Negash
Attorney, Agent, or Firm—Pollock, Vande Sande and Priddy

[57] ABSTRACT

First and second optical couplers are inserted in linear bus type first and second data buses for transmission in opposite directions, respectively, by which each terminal equipment is connected to the first and second data buses. In the terminal equipment first and second monitor pulses are generated by a monitor pulse generator at different points of time in a low-level period of a frame synchronizing signal of each frame forming data to be transmitted, by which first data to be transmitted, appended with the first monitor pulse, and second data to be transmitted, appended with the second monitor pulse, are formed and are provided to the first and second optical couplers, respectively. The optical data signals branched from the first and second optical couplers are received by a common photodetector. A monitor pulse detector outputs an error flag when it detects either one of the first and second monitor pulses in the received sigal.

6 Claims, 5 Drawing Sheets

OPTICAL TRANSCEIVER

BACKGROUND OF THE INVENTION

The present invention relates to an optical transceiver which is provided at each terminal in a data communication system employing a pair of optical data buses which are of a linear bus type, such as an optical data bus for aircraft used to transmit optical signals in opposite directions.

In general, a linear bus system is one way of forming an optical data bus. In the linear bus system a plurality of terminals are connected to a plurality of optical couplers inserted in an optical data bus, and hence are linearly arranged and connected (without forming loops or stars). Since the optical coupler is directional, however, two optical data buses are needed for transmission and reception between terminals. Accordingly, each terminal has two systems of optical transceivers so that it is capable of transmission and reception over either of the two optical data buses.

A description will be given first, with reference to FIG. 1, of a conventional linear bus type optical data communication system. Each terminal equipment TEi (i=1, 2, ... ) is connected via optical couplers C1 and C2 to a linear bus type first optical data bus L1 for transmission in a first direction A and a linear bus type second optical data bus L2 for transmission in a second direction B opposite to the first direction A. The terminal equipment TEi comprises an optical transceiver PTi connected to the optical couplers C1 and C2 via transmitting optical fibers FT1 and FT2 and receiving optical fibers FR1 and FR2, a bus controller BCi for controlling communications, and a data terminal DTi for transmitting and receiving data. The terminal equipment TEi provides an optical data signal on the optical data buses L1 and L2 and receives an optical data signal therefrom. Each terminal equipment TEi delivers the optical data signal, using a different time slot so that the optical data signal will not interfere with those from other terminal equipment. The bus controller BCi receives the data transmitted from the terminal equipment TEi so as to see if the transmitted and the received data do not coincide, and if not, the bus controller BCi will judge that an abnormality is present in one of the transmitting and receiving routes such as the optical fibers FT1, FT2, FR1 and FR2, and the optical couplers C1 and C2. The bus controller BCi, which controls communications between data terminals DTi according to predetermined rules, is connected to a data input/output end of each data terminal DTi. The optical transceiver PTi is connected between the bus controller BCi and the corresponding optical couplers C1 and C2. Transmission data SD input from the bus controller BCi into the optical transceiver PTi is supplied in parallel to transmitting circuits T1 and T2 and, after being modulated, they are supplied to light emitting elements (LED's, for example) LE1 and LE2, wherein they are converted to optical signals, which are provided to input ports pb of the optical couplers C1 and C2 via the optical fibers FT1 and FT2, respectively.

In each optical coupler C1 an optical data signal provided to its input port pa from the first optical data bus L1 or an optical data signal provided to the input port pb from the optical fiber FT1 is split into two optical data signals, which are provided to output ports pc and pd. The optical data signal at the output port pc is supplied via the first optical bus L1 to the neighboring optical coupler C1, whereas the optical data signal at the output port pd is supplied via the optical fiber FR1 to a photodetector (a photodiode, for example) PD1 of the terminal equipment TEi itself, wherein it is converted to an electric signal, which is received by a receiving circuit R1 and then demodulated.

In each optical coupler C2 an optical data signal provided to its input port pa from the second optical data bus L2 or an optical data signal provided to the input port pb from the optical fiber FT2 is split into two optical data signals, which are provided to output ports pc and pd. The optical data signal at the output port pc is transmitted via the second optical data bus L2 to the neighboring optical coupler C2, whereas the optical data signal at the output port pd is provided via the optical fiber FR2 to a photodetector PD2 of the optical transceiver PTi of the terminal equipment TEi itself, wherein it is converted into an electric signal, which is received by a receiving circuit R2 and then demodulated.

The outputs of the receiving circuits R1 and R2 are applied via an OR gate OR to the bus controller BCi, while at the same time they are applied to a comparator CP, wherein they are checked with each other, and if they do not coincide, an error flag EF is provided to the bus controller BCi. When the first transmitting and receiving system composed of the transmitting circuit T1, and light emitting element LE1, the optical fiber FT1, the optical coupler C1, the optical fiber FR1, the photodetector PD1 and the receiving circuit R1 and the second transmitting and receiving system composed of the transmitting circuit T2, the light emitting element LE2, the optical fiber FT1, the optical coupler C2, the optical fiber FR2, the photodetector PD2 and the receiving circuit R2 are both normal during transmission from the terminal equipment TEi, the error flag EF will not be set. While the terminal equipment TEi is not transmitting but instead is receiving optical data from another terminal equipment TEj (j≠i) in a certain time slot via either one of the first and second optical data buses L1 and L2, no optical data is provided in that time slot of the other optical data bus. Consequently, the outputs of the receiving circuits R1 and R2 are checked with each other in the comparator CP and the error flag EF is provided, but since the terminal equipment TEi is not transmitting, the error flag EF is ignored in the bus controller BCi.

As described above, an abnormality in the transmitting and receiving systems of the optical transceiver including the optical couplers C1 and C2 inserted in the data buses can be detected by comparing the outputs of the receiving circuits R1 and R2 in the comparator CP.

The optical data communication shown in FIG. 1 uses the Manchester code, for example. The Manchester code represents logic "1" with "01" (i.e. "LH") and logic "0" with "10" (i.e. "HL"); so that even if either the same logic "1" or "0" is repeated many times, the Manchester coded codes therefor are repeated alternation of "L" and "H" in either case. That is, logical data is made alternating by the Manchester coding, accordingly the Manchester code is suitable for optical data communications. In the following description of the invention "one bit" indicates one Manchester code "01" or "10" and "one bit length" indicates its length. According to such Manchester coding, it is only when the bit "01" is followed by the bit "10" that the high level continues and the greatest number of high levels which can continue is two (one bit length). Similarly, the low level continues only when the bit "10" is followed by the bit "01" and the greatest number of low levels which can continue is two (one bit length). In the optical data communication utilizing such Manchester codes, a signal containing a sequence of logical levels which are impossible to occur in the Manchester coding, for example, a signal containing three of more high and low levels in succession (1.5 bits in Manchester code), is used as a synchronizing signal so that it is distinguishable from Manchester coded data. This prior art example is assumed to employ, as a synchronizing signal SYN, a signal "HHHLLL" (i.e. "111000") of a 3-bit length (in Manchester code equivalent).

As shown on Row A in FIG. 2, one frame of the signal which is used in such an optical data communication is composed of a 3 bit long synchronizing signal SYN, 16-bit Manchester coded data DD and a 1-bit parity bit PB. As mentioned above, the synchronizing signal SYN is composed of a high-level signal of an $l \geq 5$ bit length and a low-level signal of an $m \geq 1.5$ bit length. In the example of FIG. 1, $l=m=1.5$. As shown on Row B in FIG. 2, one word string is made up of a plurality of such frames and a plurality of such word strings are sequentially coupled, with a 4-bit, low-level guard gap GG interposed therebetween, thus forming a message. In the optical data communication such a message is inserted in an empty time slot for data transmission. Messages are each separated by a terminal gap TG composed of a low level of at least eight bits.

There has been a strong demand for an economical and small-sized optical data communication system and the same is true of the optical transceiver therefor. However, no satisfactory solutions have been proposed so far.

SUMMARY OF THE INVENTION

It is therefore an object of the present invention to provide a small-sized and economical optical transceiver.

The optical transceiver of the present invention includes: a receiving circuit for receiving and demodulating split optical data signals from first and second optical couplers inserted, for each data terminal, in a linear bus type first optical data bus for transmission in a first direction and a linear bus type second optical data bus for transmission in a second direction opposite to the first one; and first and second transmitting circuits which modulate transmission data containing a series of frames, convert them into optical data signals and then provide them to the first and second optical couplers, respectively. Each frame of transmission date and received data contains a reframe synchronizing signal composed of a l ($l \geq 1.5$) bit long high-level signal and an m ($m \geq 1.5$) bit long low-level signal, followed by a Manchester code of plural bits. The two optical signals split by the first and second optical couplers and provided via optical fibers therefrom, respectively, are received by a common photodetector and are demodulated by a common circuit. A monitor pulse appending circuit is provided which detects a period during which a predetermined logical level lasts for at least 1.5 bit length in the transmission and at predetermined different points of time thereafter appends high-level first and second monitor pulses to the transmission data to form first and second pieces of transmission data, which are supplied to the first and second transmitting circuits, respectively. Further, a monitor pulse detector is provided which receives the demodulated outputs of the receiving circuits, detects the first and second monitor pulses in the demodulated output and, when either one or both of the pulses are absent, generates an error flag.

DESCRIPTION OF THE PREFERRED EMBODIMENTS

Figure 1:
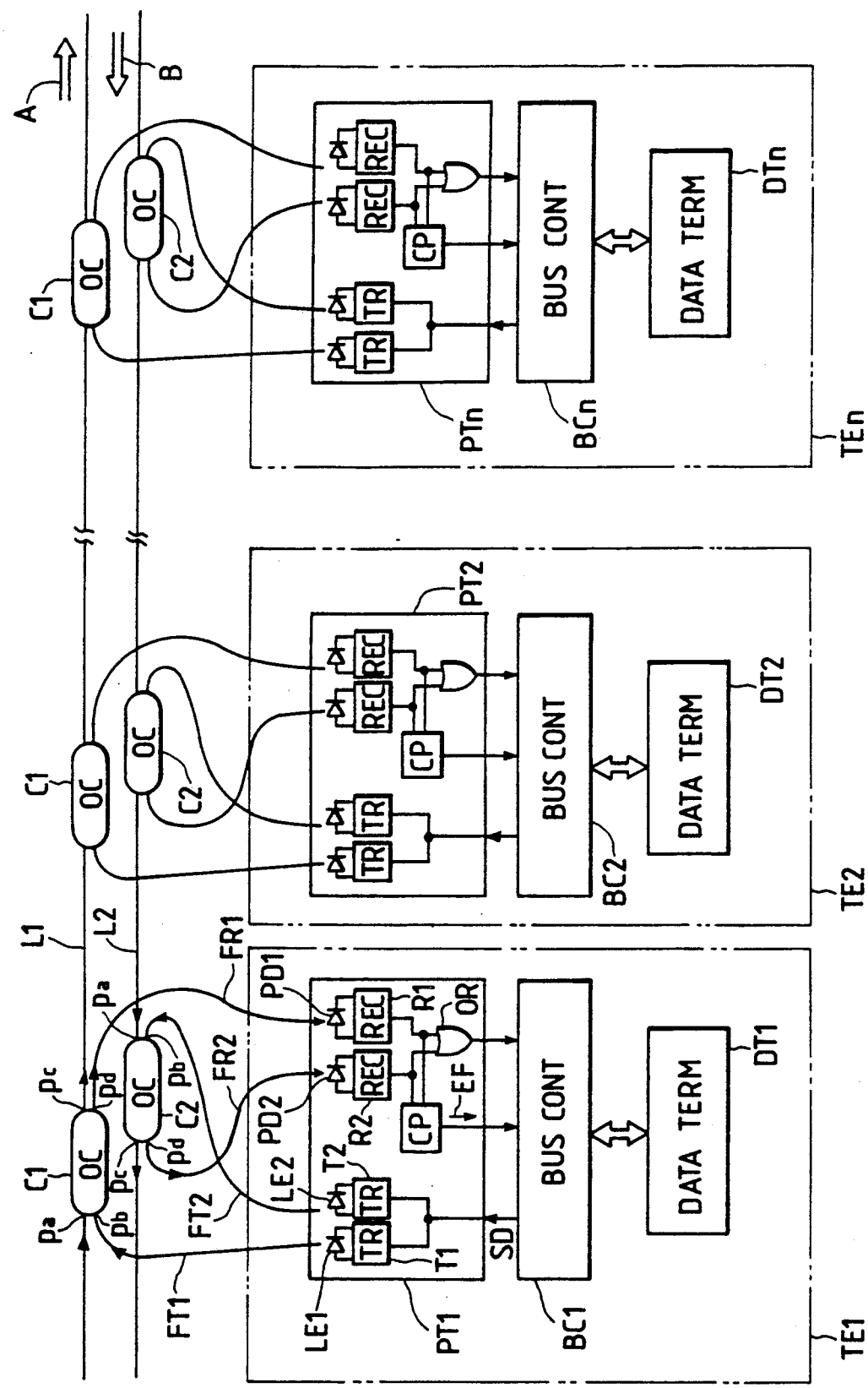
FIG. 1 is a block diagram showing an optical data communication system including conventional optical transceivers.
Figure 2:
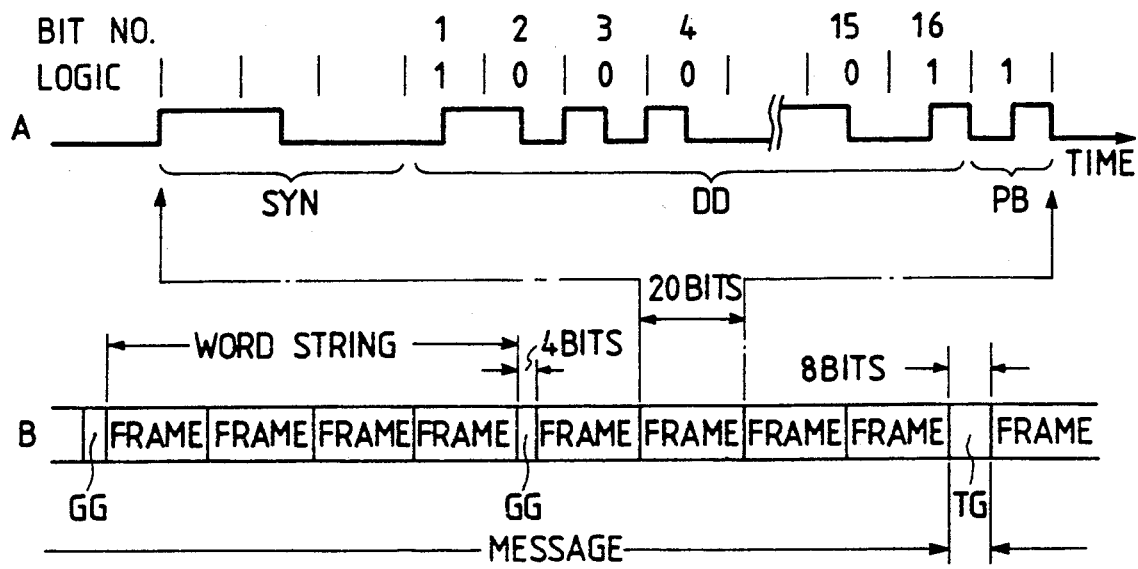
FIG. 2 is a diagram showing the format of data which is transmitted and received between the optical transceivers.
Figure 3:
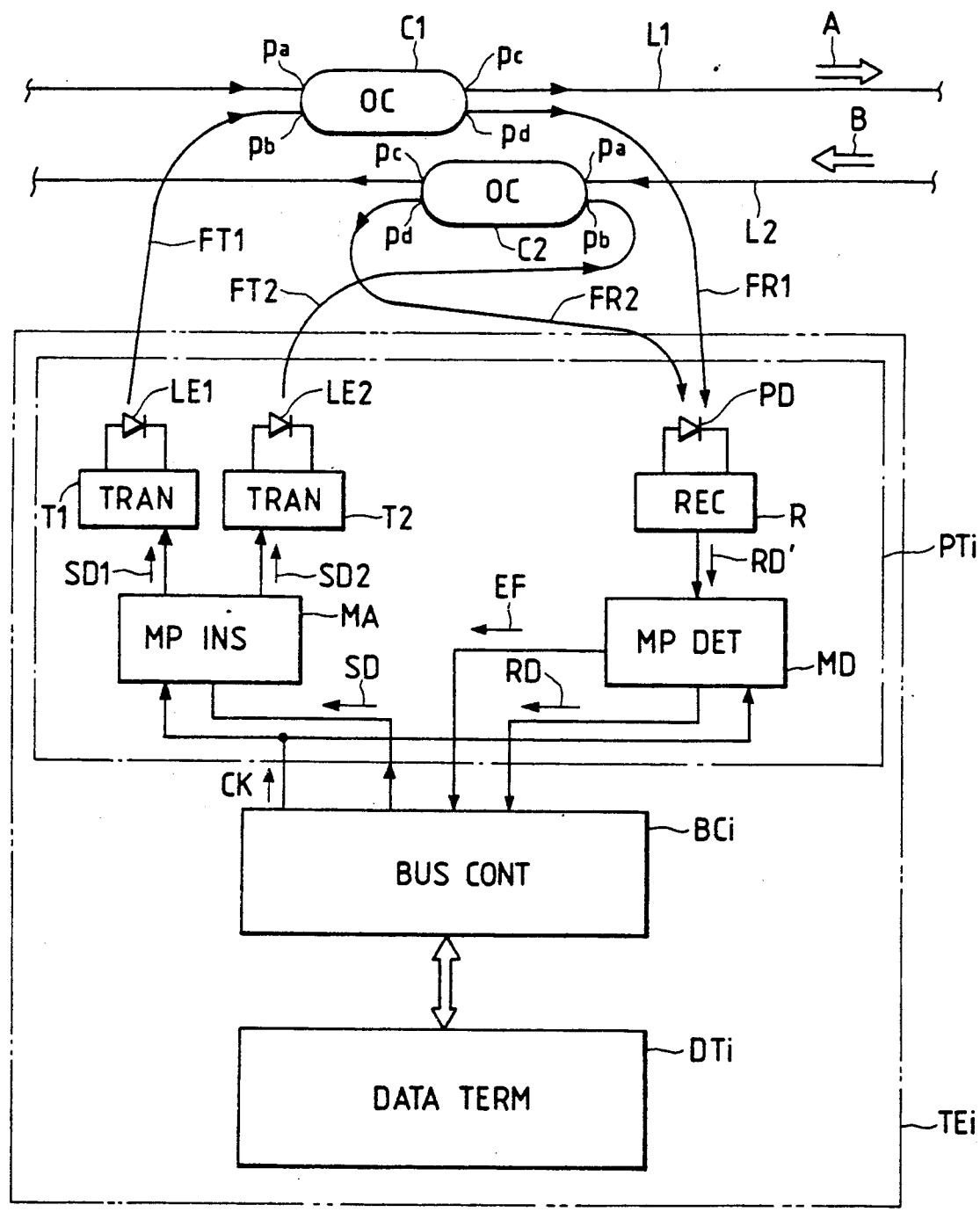
FIG. 3 is a block diagram illustrating an embodiment of the present invention.

An embodiment of the present invention is illustrated in FIG. 3, in which the parts corresponding to those in FIG. 1 are identified by the same reference numerals and no further description will not be given of them. According to the present invention, a monitor pulse appending circuit MA is provided between the bus controller BCi and the transmitting circuits T1 and T2 of each terminal equipment TEi, the two lines of photodetectors and receiving circuits in the prior art are reduced to only one line, and a monitor pulse detector MD is provided between the receiving circuit R and the bus controller BCi.

Figure 4:
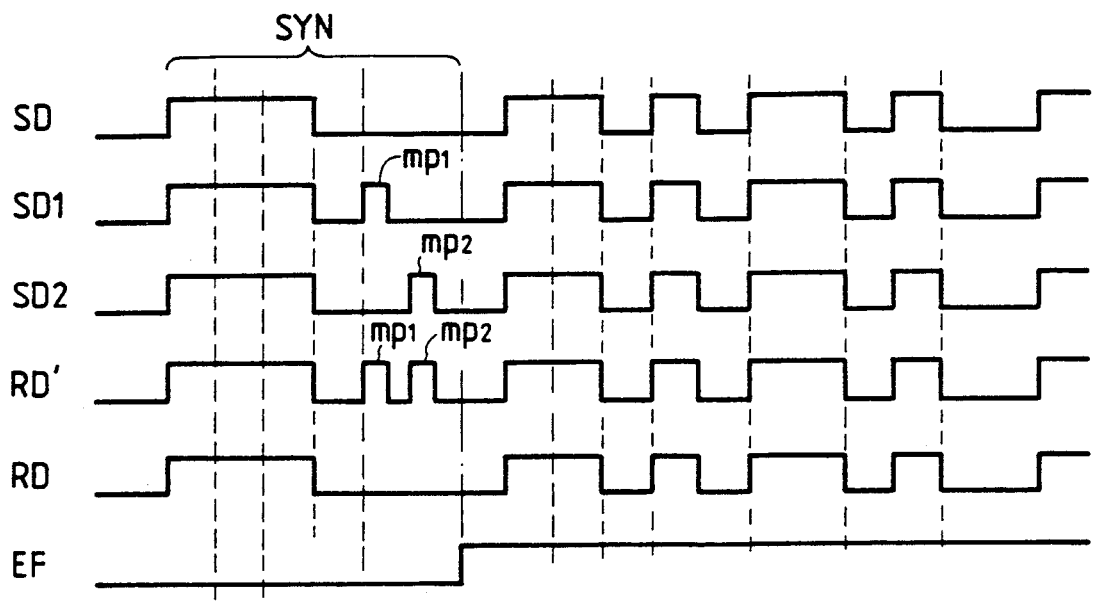
FIG. 4 shows waveforms occurring at principal parts in the embodiment of FIG. 3.

In the monitor pulse appending circuit MA, data to be transmitted SD input thereinto is appended with first and second ¼ bit long monitor pulses mp1 and mp2 which rise up, for example, a ½ bit period and a bit period, respectively, after the beginning of the low-level period of the 3 bit long frame synchronizing signal SYN of the data SD, as shown in FIG. 4. The resulting pieces of data to be transmitted SD1 and SD2 are applied to the transmitting circuits T1 and T2, respectively.

As in the prior art example, these pieces of data SD1 and SD2 are modulated and converted into optical signals, which are applied to the optical couplers C1 and C2. Optical signals branched from the optical couplers C1 and C2 are applied via the optical fibers FR1 and FR2 to a common photodetector PD, wherein they are converted to electric signals, which are provided to the common receiving circuit R. The received signal RD' demodulated by the receiving circuit R has the monitor pulses mp1 and mp2 in the low-level period of the frame synchronizing signal SYN as shown in FIG. 4, if the transmitting and receiving systems of the optical couplers C1 and C2 and the optical transceiver PTi are normal.

In the monitor pulse detector MD it is checked whether or not the monitor pulses mp1 and mp2 are present in each frame of the received signal RD' during transmission from the terminal equipment TEi, and at the same time the monitor pulses mp1 and mp2 are removed from the received signal RD', then the received signal RD with no monitor pulses as shown in FIG. 4 is applied to the bus controller BCi. In the case where only one or no monitor pulse is detected, some abnormality exists in the signal paths for transmission and reception; so that the error flag EF such as shown in FIG. 4 is provided to the bus controller BCi.

Figure 5:
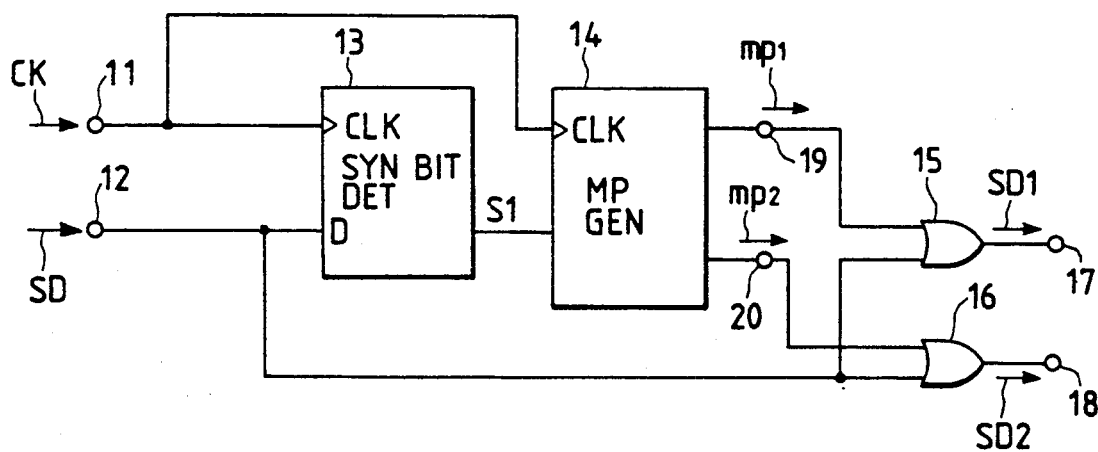
FIG. 5 is a block diagram illustrating an example of a monitor pulse appending circuit MA used in the embodiment of FIG. 3.
Figure 6:
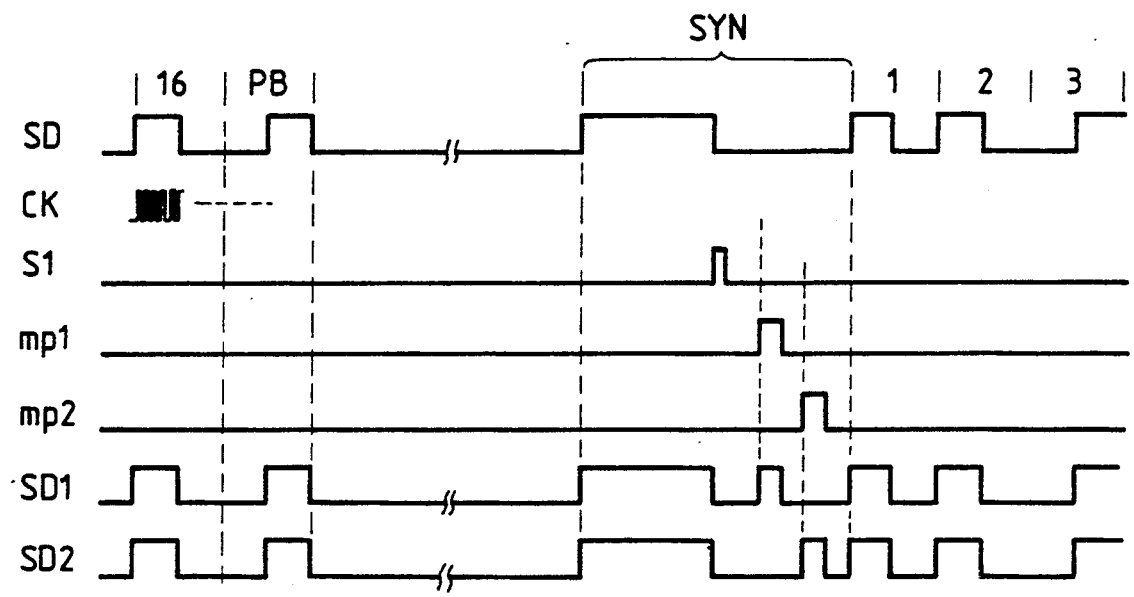
FIG. 6 shows waveforms occurring at principal parts in the circuit depicted in FIG. 5.

The monitor pulse appending circuit MA has such a construction as depicted in FIG. 5, for example. A clock CK (32 MHz, for instance) and the data to be transmitted SD shown in FIG. 6, supplied from the bus controller BCi to input terminals 11 and 12, respectively, are applied to a synchronizing bit detector 13 formed by a counter. The synchronizing bit detector 13 counts the number of clock pulses CK during the high-level period of the transmission data SD and yields a detected signal S1 when the count value is equal to a value corresponding to the 1.5 bit length. Accordingly, the detected signal S1 is produced at the same time as the frame synchronizing signal SYN goes low the 1.5 bit long period after its rise to the high level (see FIG. 6) and the signal S1 is applied to a monitor pulse generator 14. In the monitor pulse generator 14 a timer is started by the detected signal S1 and at time points ½ bit and 1 bit long periods after the rise of the detected signal S1, respectively, the monitor pulses mp1 and mp2 each of the ¼ bit length are generated in the low-level period of the frame synchronizing signal SYN as shown in FIG. 6 and they are provided to different output terminals 19 and 20. The first and second monitor pulses mp1 and mp2 thus derived at the output terminals 19 and 20 are applied to OR gates 15 and 16, respectively, wherein they are superimposed on the data SD, and the pieces of data to be transmitted SD1 and SD2 shown in FIG. 6 are supplied to output terminals 17 and 18.

Figure 8:
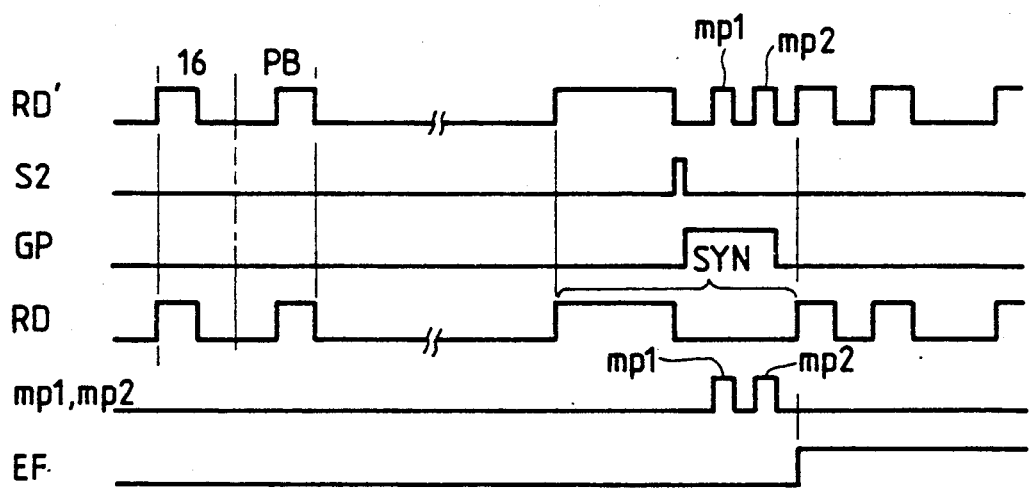
FIG. 8 shows waveforms occurring at principal parts in the circuit of FIG. 7.
Figure 7:
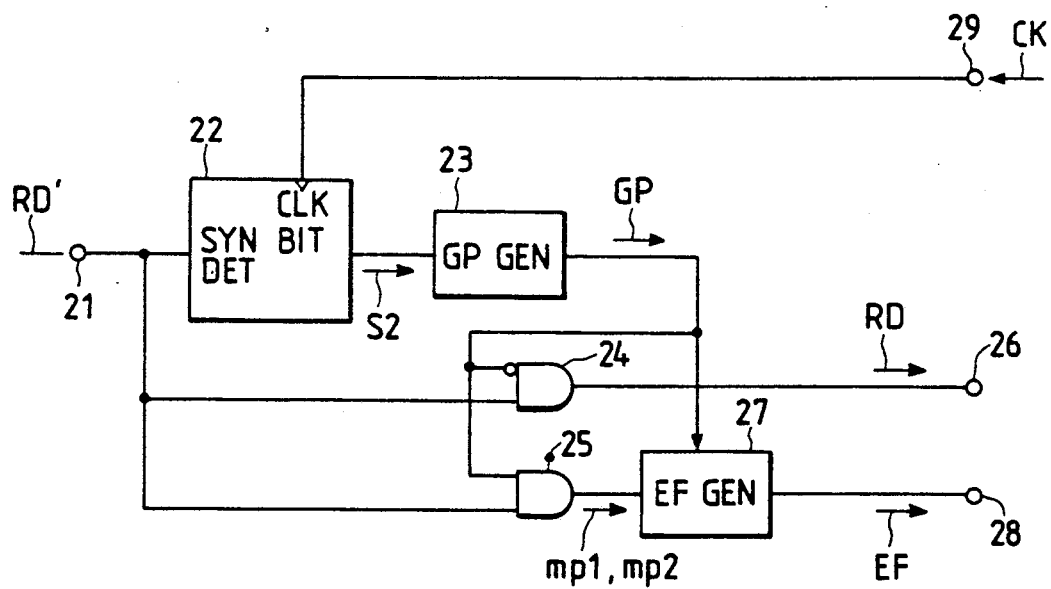
FIG. 7 is a block diagram illustrating an example of a monitor pulse detector MD used in the embodiment of FIG. 3.

FIG. 7 illustrates an example of the construction of the monitor pulse detector MD. The received signal RD' applied from the receiving circuit R to an input terminal 21, shown in FIG. 8, is provided to a synchronizing bit detector 22 similar to detector 13 in FIG. 5. The synchronizing bit detector 22 generates a detected signal S2 (see FIG. 8) at the same time as the frame synchronizing signal SYN in the received signal RD' falls the 1.5 bit long period after its rise to the high level, the detected signal S2 being applied to a gate pulse generator 23. In the gate pulse generator 23 a timer is started by the detected signal S2 and a gate pulse GP of a width longer than the 1 bit length but shorter than the 1.5 bit length, as shown in FIG. 8, is generated in the low-level period of the frame synchronizing signal SYN. The gate pulse GP is applied to one input terminal of each of AND gates 24 and 25, which are supplied at the other input terminals with the received signal RD'. For only the duration of the gate pulse GP the AND gate 24 is disabled, by which the monitor pulses mp1 and mp2 are removed from the received data RD', and the received signal RD with no monitor pulses is provided to an output terminal 26. In the AND gate 25 the gate pulse GP and the received signal RD' are ANDed, by which the monitor pulses mp1 and mp2 are extracted as shown in FIG. 8 and are applied to an error flag generator 27. The error flag generator 27 checks the presence of the monitor pulses mp1 and mp2 and, when one or both of them are not detected, provides the error flag EF to an output terminal 28. The clock CK is supplied from the bus controller BCi to the synchronizing bit detector 22 via a terminal 29.

The foregoing embodiment of the present invention has been described in connection with the case where a frame synchronizing signal, which is not the Manchester code, is detected and monitor pulses are inserted in the received signal. The principle of the invention is based on the fact that the monitor pulses can be detected in distinction from Manchester code data by detecting the period during which the low or high logical level, which is not the Manchester code data, lasts for the 1.5 bit length or more and then by inserting the monitor pulses in a predetermined period subsequent to the detected period. Accordingly, the present invention is also applicable to the 4 bit long guard gap GG interposed between the word strings each composed of a sequence of frames. That is, in the guard gap GG which is the 4 bit long low-level period following each word string, a predetermined period of time, for example, longer than the 1.5 bit length, after the start of the low-level period is detected and, as in the embodiment of FIG. 5, the pulse S1 is generated. In consequence, the monitor pulse generator generates the monitor pulses mp1 and mp2 at two different time points after the above-noted detected time point. In the arrangement in which the synchronizing bit detector 13 detects a predetermined high-level period (of the 1.5 bit length) and generates the pulse S1, the predetermined low-level period can be obtained simply by applying the data SD to the input terminal D of the detector 13 after inverting the logic of the input data and by setting the clock CK counting period in the detector 13 to the low-level period to be detected. The synchronizing bit detector 22 of the monitor pulse detector in FIG. 7 is constructed in the same manner as mentioned above. The low-level period can be distinguished from the low-level period of the frame synchronizing signal SYN by selecting the former to be longer than the latter. Thus, the two monitor pulses need only to be produced the 1.5 bit length after the start of the low-level period of the guard gap GG but within 4 bit lengths.

It is evident that the principle of the present invention is similarly applicable to the terminal gap TG between a sequence of word strings. In this instance, the terminal gap TG can be distinguished from the low-level period of the guard gap GG by generating two monitor pulses until the end of the terminal gap TG after the elapse of the low-level period longer than the guard gap GG.

As described above, according to the present invention, the two systems of photodetectors PD and receiving circuits R needed in the prior art can be reduced to one system by providing a simple-structured monitor pulse appending circuit MA and a simple-structured monitor pulse detector MD between the bus controller BCi and the transmitting circuits T1 and T2 and between the bus controller BCi and the receiving circuit R. Furthermore, the comparator CP needed in the prior art for checking the outputs of the two receiving circuits with each other can be omitted. Thus, the present invention permits economization and miniaturization of the optical transceiver and also affords reduction of the circuit scale, which provides for enhanced reliability in the entire optical data communication system.

According to the present invention, the transmitted optical signals of each terminal, split by the optical couplers C1 and C2, are applied via the optical fibers FR1 and FR2 to the common photodetector PD. Accordingly, the output of the photodetector PD has an intensity twice as high as in the prior art where the transmitted optical signals are individually received by the two photodetectors PD1 and PD2 and hence the SN ratio is improved.

It will be apparent that many modifications and variations may be effected without departing from the scope of the novel concepts of the present invention.

What is claimed is:

1. An optical transceiver comprising:
   receiving means having a first optical coupler inserted in a linear bus type first data bus for transmission in a first direction and a second optical coupler inserted in a linear bus type second data bus for transmission in a direction opposite to said first direction, for receiving and demodulating optical data signals branched from said first and second optical couplers;
   first and second transmitting means whereby pieces of data to be transmitted, each containing a sequence of plural frames, are modulated and converted into optical signals and supplied to said first and second optical couplers, respectively, each frame of said data to be transmitted including a frame synchronizing signal composed of an l, $l \geq 1.5$, bit long high-level period and an m, $m \geq 1.5$, bit long low-level period and Manchester code data of plural bits following said frame synchronizing signal;
   a photodetector to which two optical signals split by said first and second optical couplers are supplied via optical fibers, respectively, the output of said photodetector being applied to said receiving means;
   a monitor pulse appending circuit which detects the duration of a predetermined logical level in said data to be transmitted for a predetermined first period equal to or longer than a 1.5 bit length and appends first and second high-level monitor pulses to said data to be transmitted at different points of time within a predetermined second period after said detection to form first data to be transmitted and second data to be transmitted, said first data to be transmitted and said second data to be transmitted being applied to said first and second transmitting means, respectively; and
   a monitor pulse detector which is supplied with the demodulated output of said receiving means, detects said first and second monitor pulses and, when at least one of them is absent, outputs an error flag.

2. The optical transceiver of claim 1, wherein said monitor pulse appending circuit includes: a synchronizing bit generator which detects the duration of said predetermined logical level for a period equal to or more than an l bit length and outputs a synchronizing bit detected pulse; a monitor pulse generator which responds to said synchronizing bit detected pulse to provide said first and second monitor pulses to first and second terminals, respectively; a first gate which appends said first monitor pulse from said first terminal to said data to be transmitted and outputs it as said first data to be transmitted; and a second gate which appends said second monitor pulse from said second terminal to said data to be transmitted and outputs it as said second data to be transmitted.

3. The optical transceiver of claim 1, wherein said monitor pulse detector includes: a synchronizing bit detector which detects the duration of said predetermined logical level for a period equal to or longer than an l bit length and outputs a synchronizing bit detected pulse; a gate pulse generator which responds to said synchronizing bit detected pulse to generate a gate pulse of a width large enough to cover said first and second monitor pulses; a first gate which is enabled for the duration of said gate pulse to permit the passage therethrough of said first and second monitor pulses in said demodulated output; an error flag generator which responds to either one of said first and second monitor pulses in the output of said first gate to output said error flag; and a second gate which is disabled for the duration of said gate pulse to remove said first and second monitor pulses from said demodulated output and outputs received data.

4. The optical transceiver of claim 1, 2, or 3, wherein said predetermined logical level is a high level and said second period is said low-level period of said frame synchronizing signal.

5. The optical transceiver of claim 1, 2, or 3, wherein said pieces of data to be transmitted are each composed of a plurality of word strings each including a sequence of plural frames, said plurality of word strings are sequentially coupled together by a guard gap composed of a low-level period of a certain bit length larger than the bit length of said frame synchronizing signal, said predetermined logical level is a low level, and said first period is longer than at least said m bit length.

6. The optical transceiver of claim 1, 2, or 3, wherein said pieces of data to be transmitted are each composed of a plurality of word strings each including a sequence of plural frames, said plurality of word strings are sequentially coupled together by a guard gap composed of a low-level period of a certain bit length larger than the bit length of said frame synchronizing signal, a terminal gap composed of a low-level period of a bit length at least twice as long as said guard gap is provided at either end of each of said word strings, said predetermined logical level is a low level, and said first period is longer than at least said guard gap.

* * * * *